(12) United States Patent
Noh et al.

(10) Patent No.: US 11,209,946 B2
(45) Date of Patent: Dec. 28, 2021

(54) TOUCH SENSOR AND IMAGE DISPLAY DEVICE INCLUDING THE SAME

(71) Applicant: DONGWOO FINE-CHEM CO., LTD., Jeollabuk-do (KR)

(72) Inventors: Sung Jin Noh, Gyeonggi-do (KR); Han Tae Ryu, Gyeonggi-do (KR); Do Hyoung Kwon, Gyeonggi-do (KR); Sang Jin Park, Gyeonggi-do (KR); Jun Gu Lee, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 17/224,414

(22) Filed: Apr. 7, 2021

(65) Prior Publication Data
US 2021/0223914 A1 Jul. 22, 2021

Related U.S. Application Data

(63) Continuation of application No. PCT/KR2020/000049, filed on Jan. 2, 2020.

(30) Foreign Application Priority Data

Jan. 22, 2019 (KR) .................. 10-2019-0008183
Jun. 18, 2019 (KR) .................. 10-2019-0072050

(51) Int. Cl.
*G06F 3/044* (2006.01)

(52) U.S. Cl.
CPC .......... *G06F 3/0445* (2019.05); *G06F 3/0446* (2019.05); *G06F 2203/04111* (2013.01)

(58) Field of Classification Search
CPC .... G06F 3/0412; G06F 3/0445; G06F 3/0443; G06F 3/0446; G06F 2203/04103; G06F 2203/04111
See application file for complete search history.

(56) References Cited

U.S. PATENT DOCUMENTS

2014/0036170 A1    2/2014  Tomotake et al.
2016/0299596 A1*  10/2016  den Boer .............. G06F 3/0443

FOREIGN PATENT DOCUMENTS

| KR | 10-2012-0125824 A | 11/2012 |
| KR | 10-2015-0079433 A | 7/2015 |
| KR | 10-2017-0008572 A | 1/2017 |
| KR | 10-2018-0130797 A | 12/2018 |
| KR | 10-2019-0003235 A | 1/2019 |
| KR | 10-1936939 B1 | 1/2019 |
| WO | WO 2013/063176 A1 | 5/2013 |

OTHER PUBLICATIONS

International Search Report for PCT/KR2020/000049 dated Apr. 10, 2020.
Office action dated Sep. 18, 2020 from Korean Patent Office in a counterpart Korean Patent Application No. 10-2019-0072050 (English translation is also submitted herewith.).

* cited by examiner

*Primary Examiner* — Deeprose Subedi
(74) *Attorney, Agent, or Firm* — The PL Law Group, PLLC

(57) ABSTRACT

A touch sensor according to an embodiment of the present invention includes a substrate layer, and sensing electrodes arranged on the substrate layer. The sensing electrodes includes a stacked structure of a transparent oxide electrode layer and a metal layer, and has an optical ratio of 5 or less. A structure of high transmittance and low reflectance can be implemented by a control of the optical ratio of the sensing electrodes.

20 Claims, 5 Drawing Sheets

TOUCH SENSOR AND IMAGE DISPLAY DEVICE INCLUDING THE SAME

CROSS REFERENCE TO RELATED APPLICATIONS AND CLAIM OF PRIORITY

The present application is a continuation application to International Application No. PCT/KR2020/000049 with an International Filing Date of Jan. 2, 2020, which claims the benefit of Korean Patent Applications No. 10-2019-0008183 filed on Jan. 22, 2019, and No. 10-2019-0072050 filed on Jun. 18, 2019 at the Korean Intellectual Property Office, the disclosures of which are incorporated by reference herein in their entirety.

BACKGROUND

1. Technical Field

The present invention relates to a touch sensor and an image display device including the same. More particularly, the present invention relates to a touch sensor including patterned sensing electrodes and an image display device including the same.

2. Background of the Related Art

As information technologies are being developed, various demands in display devices having thinner dimension, light-weight, high efficiency in power consumption, etc., are increasing. The display device may include a flat panel display device such as a liquid crystal display (LCD) device, a plasma display panel (PDP) device, an electro-luminescent display device, an organic light emitting diode (OLED) display device, etc.

A touch panel or a touch sensor capable of inputting a user's direction by selecting an instruction displayed on a screen with a finger or an inputting tool is also developed. The touch panel or the touch sensor may be combined with the display device so that display and information input functions may be implemented in one electronic device.

In the touch sensor, sensing electrodes including a conductive material such as a metal for sensing of the user's touch may be arranged on a substrate. When the touch sensor is inserted into the display device, an image quality implemented by the display device may be deteriorated by the sensing electrodes. For example, the sensing electrode may be visually recognized by the user to disturb the image. Additionally, a color sense of the image may be changed by the sensing electrodes.

Thus, a design of the sensing electrodes for maintaining a predetermined conductivity and sensitivity for touch sensing while also considering optical properties for improving the image quality is required.

For example, as disclosed in Korean Patent Application Publication No. 2014-0092366, various image display devices combined with a touch screen panel including a touch sensor has been developed recently, but demands of the touch sensor or the touch panel having improved optical properties are constantly present.

SUMMARY

According to an aspect of the present invention, there is provided a touch sensor having improved optical and mechanical properties.

According to an aspect of the present invention, there is provided an image display device including the touch sensor.

The above aspects of the present invention will be achieved by one or more of the following features or constructions:

(1) A touch sensor, including: a substrate layer; and sensing electrodes arranged on the substrate layer, the sensing electrodes including a stacked structure of a transparent oxide electrode layer and a metal layer, and having an optical ratio of 5 or less as defined by Equation 1:

Optical Ratio=extinction coefficient of the metal layer/(|a refractive index of the transparent oxide electrode layer−a refractive index of the metal layer|). [Equation 1]

(2) The touch sensor according to the above (1), wherein the optical ratio of the sensing electrode is 3 or less.

(3) The touch sensor according to the above (1), wherein the sensing electrode includes a first transparent oxide electrode layer, the metal layer and a second transparent oxide electrode layer sequentially stacked on the substrate layer.

(4) The touch sensor according to the above (3), wherein an optical ratio between the metal layer and the first transparent oxide electrode layer is 5 or less, and an optical ratio between the metal layer and the second transparent oxide electrode layer is 5 or less.

(5) The touch sensor according to the above (3), wherein each thickness of the first transparent oxide electrode layer and the second transparent oxide electrode layer is from 100 to 700 Å, and a thickness of the metal layer is from 50 to 300 Å.

(6) The touch sensor according to the above (3), wherein each thickness of the first transparent oxide electrode layer and the second transparent oxide electrode layer is from 300 to 500 Å, and a thickness of the metal layer is from 70 to 150 Å.

(7) The touch sensor according to the above (3), further including a refractive index matching layer formed between the first transparent oxide electrode layer and the substrate layer.

(8) The touch sensor according to the above (7), wherein the refractive index matching layer has a refractive index between a refractive index of the substrate layer and a refractive index of the first transparent oxide electrode layer.

(9) The touch sensor according to the above (1), wherein the refractive index of the transparent oxide electrode layer is from 1.7 to 2.2.

(10) The touch sensor according to the above (1), wherein the metal layer includes a silver (Ag) alloy.

(11) The touch sensor according to the above (1), wherein the sensing electrodes include first sensing electrodes and second sensing electrodes arranged in directions crossing each other.

(12) The touch sensor according to the above (11), wherein the second sensing electrodes are integrally connected in a column direction by a connection portion.

(13) The touch sensor according to the above (12), wherein the first sensing electrodes are spaced apart from each other in a row direction with the connection portion interposed therebetween, wherein the touch sensor further includes a bridge electrode electrically connecting the first sensing electrodes adjacent to each other with the connection portion interposed therebetween.

(14) The touch sensor according to the above (11), further including: an insulating layer insulating the first sensing electrodes and the second sensing electrodes from each other; and a passivation layer formed on the insulating layer, wherein at least one of the insulating layer or the passivation layer includes a barrier layer or a barrier structure including an aluminum oxide-zinc oxide (AZO) composite material, silazane, siloxane or a silicon-containing inorganic material.

(15) The touch sensor according to the above (14), wherein the barrier structure further includes an organic layer stacked on the barrier layer.

(16) The touch sensor according to the above (15), wherein the barrier structure includes a plurality of the barrier layer and a plurality of the organic layer alternately stacked.

(17) The touch sensor according to the above (14), wherein the barrier layer has a multi-layered structure including a first barrier layer and a second barrier layer.

(18) The touch sensor according to the above (17), wherein the first barrier layer includes the silicon-containing inorganic material and the second barrier layer includes silazane.

(19) A window stack structure, including: a window substrate; and the touch sensor according to embodiments as described above stacked on the window substrate.

(20) An image display device, including: a display panel; and the touch sensor according to embodiments as described above stacked on the display panel.

A touch sensor according to embodiments of the present invention, a touch sensor may include a sensing electrode having a multi-layered structure of a transparent oxide electrode layer and a metal layer to provide a low resistance and a high transmittance. An extinction coefficient and a refractive index between the metal layer and the transparent oxide electrode layer may be adjusted to reduce a light reflection from the sensing electrode and prevent the sensing electrode from being visually recognized by a user.

In some embodiments, the sensing electrode may include a triple-layered structure including a first transparent oxide electrode layer, a metal layer and a second transparent oxide electrode layer, and transmittance and corrosion resistance of the sensing electrode may be further improved.

DETAILED DESCRIPTION OF THE EMBODIMENTS

According to exemplary embodiments of the present invention, there is provided a touch sensor including a multi-layered structure of a transparent oxide electrode layer and a metal layer and having optical properties capable of preventing an electrode visual recognition. Further, a window stack structure and an image display device including the touch sensor are provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
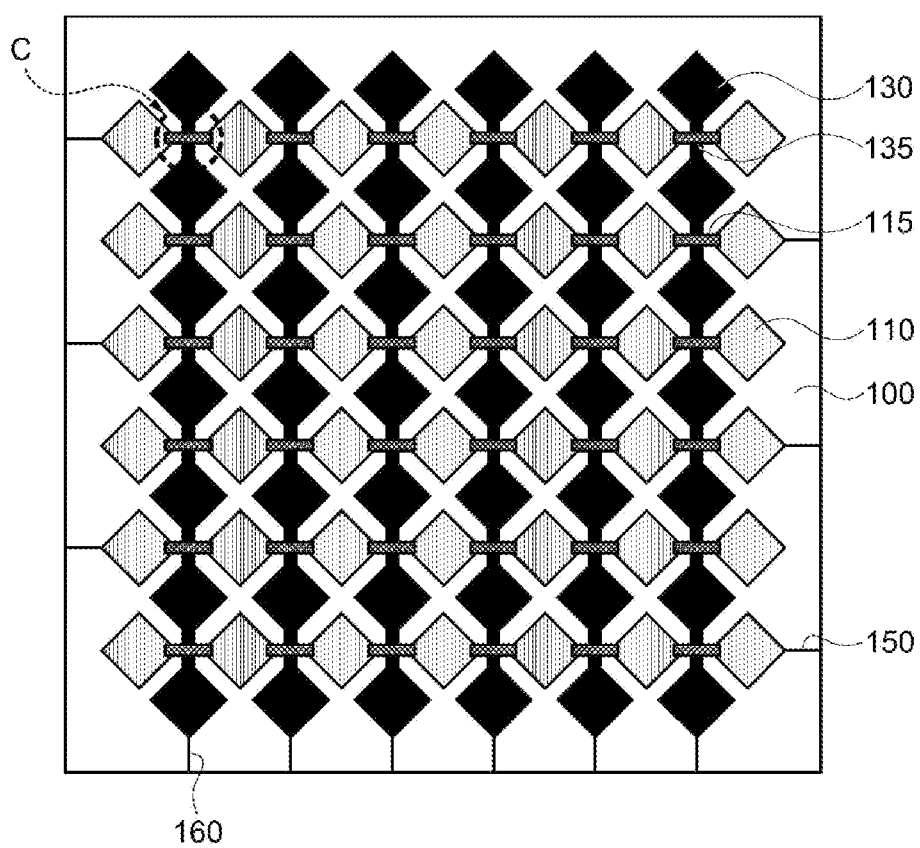
FIGS. 1 and 2 are a schematic top planar view a schematic cross-sectional view, respectively, illustrating a touch sensor in accordance with exemplary embodiments.
Figure 2:
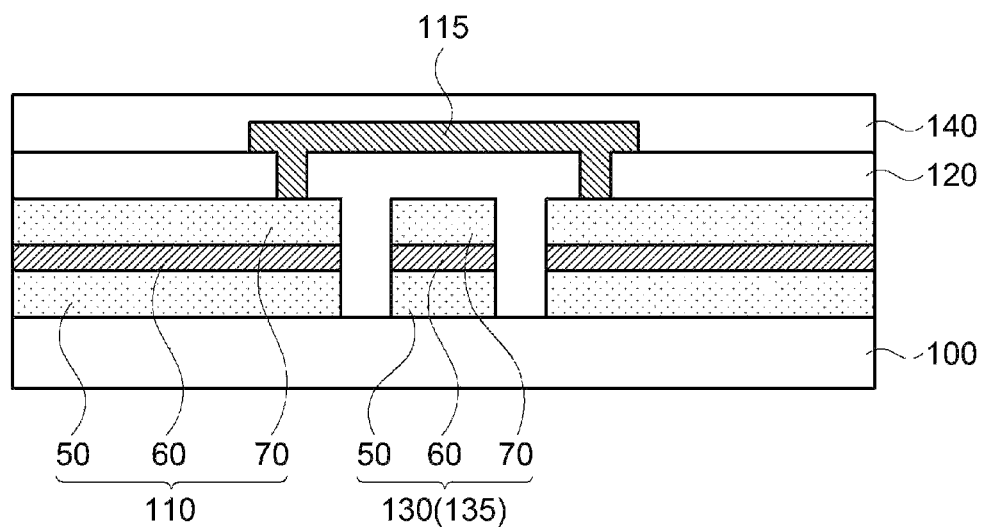

FIGS. 1 and 2 are a schematic top planar view a schematic cross-sectional view, respectively, illustrating a touch sensor in accordance with exemplary embodiments. Specifically, FIG. 2 is a cross-sectional view at an intersection region C of FIG. 1. For example, FIGS. 1 and 2 illustrate a mutual capacitance-type touch sensor.

Referring to FIG. 1, the touch sensor may include a substrate layer 100 and sensing electrodes arranged on the substrate layer 100.

The substrate layer 100 may include a support layer, an insulating interlayer or a film type substrate for forming the sensing electrode layers 110 and 130. For example, the substrate layer 100 may include a film material commonly used for a touch sensor without particular limitation, and may include, e.g., glass, a polymer and/or an inorganic insulating material. Examples of the polymer may include cyclic olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyethersulfone (PES), cellulose triacetate (TAC), polycarbonate (PC), cyclic olefin copolymer (COC), poly methyl methacrylate (PMMA), etc. Examples of the inorganic insulating material may include silicon oxide, silicon nitride, silicon oxynitride, a metal oxide, etc.

In some embodiments, a layer or a film member of an image display device to which the antenna-inserted electrode structure is applied may serve as the substrate layer 100. For example, an encapsulation layer or a passivation layer included in a display panel may serve as the substrate layer 100.

The sensing electrodes 110 and 130 may be disposed on a central area or an active area of a top surface of the substrate layer 100. When a user's touch is input onto the active area, a change in capacitance may occur by the sensing electrodes 110 and 130. Accordingly, a physical touch may be converted into an electrical signal to perform a predetermined sensing function.

The first sensing electrodes 110 and the second sensing electrodes 130 may be arranged along two different intersecting directions. For example, the first sensing electrodes 110 may be arranged along a row direction (or X-direction) on the top surface of the substrate layer 100. The second sensing electrodes 130 may be arranged along a column direction (or Y-direction) on the top surface of the substrate layer 100.

The second sensing electrodes 130 adjacent to each other in the column direction may be connected to each other by a connection portion 135. The connection portion 135 may be integrally connected with the second sensing electrodes 130 to be provided as a substantially single member.

A plurality of the second sensing electrodes 130 may be integrally connected to each other by the connection portion 135 to define a second sensing electrode column. Further, a plurality of the second sensing electrode columns may be arranged along the row direction.

Each of the first sensing electrodes 110 may have an independent island pattern shape. The first sensing electrodes 110 adjacent to each other in the row direction may be electrically connected to each other by a bridge electrode 115.

Accordingly, a first sensing electrode row including a plurality of the first sensing electrodes 110 connected to each other by the bridge electrode 115 may be defined. Further, a plurality of the first sensing electrode rows may be arranged along the column direction.

Traces may branch and extend from each of the first sensing electrode row and the second sensing electrode column. For example, a first trace 150 may extend from each of the first sensing electrode rows, and a second trace 160 may extend from each of the second sensing electrode columns.

End portions of the first and second traces 150 and 160 may be assembled on a bonding region allocated to one end portion of the substrate layer 100. The end portions may be bonded to, e.g., a flexible printed circuit board (FPCB) via an anisotropic conductive film (ACF). A touch sensor driving IC chip may be electrically connected to the first and second traces 150 and 160 through the flexible printed circuit board.

The terms "column direction" and "row direction" used in this application do not refer to an absolute direction, but are used in a relative meaning to refer to two different directions intersecting each other. For example, in FIG. 1, the first sensing electrodes 110 may be integrally connected to each other by the connection portion, and the second sensing electrodes 130 may be connected to each other through the bridge electrode.

Referring to FIG. 2, the bridge electrode 115 and the connection portion 135 may cross and overlap each other in a planar view in the intersection region C indicated by a dotted circle in FIG. 1. Additionally, as illustrated in FIG. 2, the bridge electrode 115 and the connection portion 135 may face each other in a thickness direction with the insulating layer 120 interposed therebetween.

The sensing electrodes 110 and 130 may each include a multi-layered structure of a transparent oxide electrode layer and a metal layer. In exemplary embodiments, the sensing electrodes 110 and 130 may each have a stacked structure including a first transparent oxide electrode layer 50, a metal layer 60 and a second transparent oxide electrode layer 70 sequentially stacked from the top surface of the substrate layer 100.

The first transparent oxide electrode layer 50 and the second transparent oxide electrode layer 70 may include a transparent conductive oxide such as indium tin oxide (ITO), indium zinc oxide (IZO), zinc oxide (ZnO), indium zinc tin oxide (IZTO), aluminum-doped zinc oxide (AZO), gallium-doped zinc oxide (GZO), zinc tin oxide (ZTO), indium gallium oxide (IGO), tin oxide ($SnO_2$), etc.

In some embodiments, the first transparent oxide electrode layer 50 and the second transparent oxide electrode layer 70 may include ITO or IZO.

The metal layer 60 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), molybdenum (Mo), or an alloy containing at least one of the metals (e.g., silver-palladium-copper (APC) or copper-calcium (CuCa)). These may be used alone or in combination of two or more therefrom.

In exemplary embodiments, the metal layer 60 may include a material that may satisfy an optical ratio range as will be described later, and preferably may include a silver alloy such as APC.

As described above, the metal layer 60 may be included in the sensing electrodes 110 and 130 to reduce a sensing channel resistance of the touch sensor. Additionally, a flexibility of the touch sensor may be achieved by the metal layer 60 so that damages to the sensing electrodes 110 and 130 may be prevented even when repeated bending or folding is applied to a flexible display.

The transparent oxide electrode layers 50 and 70 having relatively improved chemical resistance may be disposed on upper and lower surfaces of the metal layer 60, so that oxidation or corrosion of the metal layer 60 due to an external moisture and air penetration may be prevented. Additionally, a transmittance of the sensing electrodes 110 and 130 may be improved by the transparent oxide electrode layers 50 and 70 to prevent electrodes from being visually recognized.

In exemplary embodiments, a refractive index of the transparent oxide electrode layers 50 and 70 may be adjusted in a range from about 1.7 to 2.2 to reduce a reflection through a refractive index matching with the metal layer 60. For example, in the case of ITO, the refractive index may be adjusted through a sputtering process using a target in which a weight ratio of indium oxide ($In_2O_3$) and tin oxide ($SnO_2$) is adjusted.

In exemplary embodiments, a ratio of an extinction coefficient of the metal layer relative to a difference between refractive indexes of the metal layer and the transparent oxide electrode layer (hereinafter, referred to as an optical ratio) may be 5 or less (expressed by Equation 1 below). For example, the optical ratio may range from about 1 to 5.

Optical ratio=an extinction coefficient of the metal layer/(|a refractive index of transparent oxide electrode layer−a refractive index of metal layer|)     [Equation 1]

When Equation 1 is satisfied, a reflectance of the sensing electrodes 110 and 130 may be reduced and the transmittance may be remarkably increased. In a preferable embodiment, the optical ratio may be about 3 or less (e.g., from 1 to 3).

The extinction coefficient is an index indicating an intensity of light per unit path in the metal layer, and may be obtained by Formulae 1 and 2 below.

$$I=I_0 e^{(-\alpha T)}$$     [Formula 1]

In Formula 1, $\alpha$ is an absorption coefficient, T is a thickness, $I_0$ is an intensity of light before transmission, and I is an intensity of light after transmission.

$$\alpha = 4\pi k/\lambda_0$$     [Formula 2]

In Formula 2, $\alpha$ is an absorption coefficient, k is an extinction coefficient, and $\lambda_0$ is a wavelength of light.

Within the optical ratio range of Equation 1, a visual recognition of electrodes due to a light reflection may be effectively suppressed while preventing an excessive extinction of transmitted light of the sensing electrodes 110 and 130.

In exemplary embodiments, the optical ratio between the metal layer 60 and the first transparent oxide electrode layer 50 may be 5 or less, and the optical ratio between the metal layer 60 and the second transparent oxide electrode layer 70 may be 5 or less.

The metal layer 60 may be formed to have a thickness smaller than each thickness of the first and second transparent oxide electrode layers 50 and 70 to improve transmittance.

In some embodiments, each of the first and second transparent oxide electrode layers 50 and 70 may have a thickness from about 100 to 700 Å, preferably from about 300 to 500 Å. In some embodiments, the thickness of the metal layer 60 may be from about 50 to 300 Å, preferably from about 70 to 150 Å.

Within the thickness range, the effect of suppressing reflectance and improving transmittance may be more efficiently implemented by a combination of the value of Equation 1 as described above.

Referring to FIG. 2 again, the bridge electrode 115 may electrically connect the neighboring first sensing electrodes 110 to each other on the insulating layer 120.

For example, the bridge electrode 115 may penetrate through the insulating layer 120 and may include a contact portion in contact with the second transparent oxide electrode layer 70 included in the first sensing electrode 110.

The bridge electrode 115 may include the above-described transparent conductive oxide and/or a low-resistance metal. In some embodiments, the bridge electrode 115 may include a metal layer to prevent an increase in the channel resistance through the bridge electrode 115. In an embodiment, the bridge electrode 115 may also have a multi-layered structure of a metal layer and a transparent oxide electrode layer.

A passivation layer 140 may be formed on the insulating layer 120 to cover the bridge electrode 115. The insulating layer 120 and the passivation layer 140 may include an organic insulating material such as a siloxane-based resin, an acrylic resin, etc., or an inorganic insulating material such as silicon oxide, silicon nitride, silicon oxynitride, etc.

Figure 3:
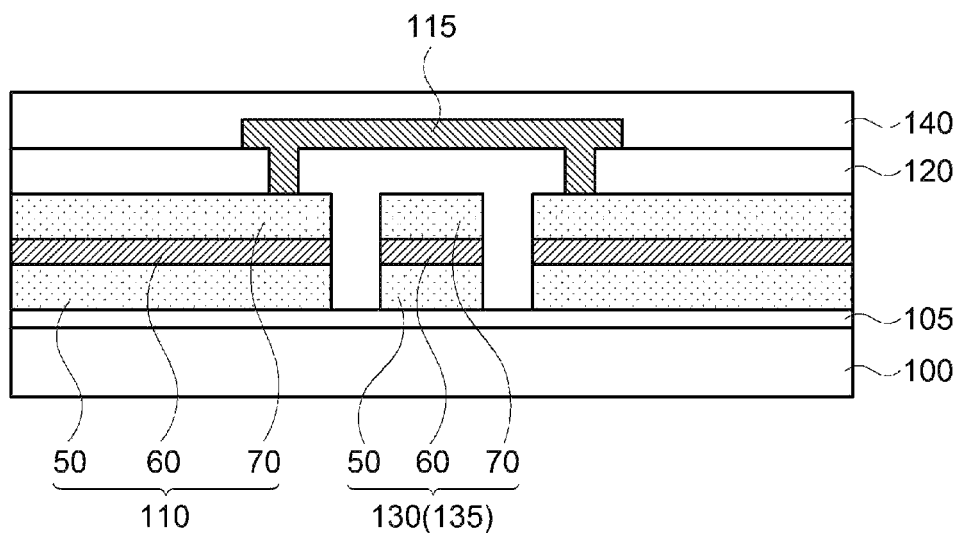
FIG. 3 is a schematic cross-sectional view, respectively, illustrating a touch sensor in accordance with some exemplary embodiments.

FIG. 3 is a schematic cross-sectional view, respectively, illustrating a touch sensor in accordance with some exemplary embodiments. Detailed descriptions of elements and structures substantially the same as or similar to those described with reference to FIGS. 1 and 2 are omitted.

Referring to FIG. 3, a refractive index matching layer 105 may be disposed between the substrate layer 100 and the sensing electrodes 110 and 130.

The refractive index matching layer 105 may have, e.g., a refractive index between the refractive index of the substrate layer 100 and the refractive index of the first transparent oxide electrode layer 50 to buffer a change of the refractive index between the first transparent oxide electrode layer 50 and the substrate layer 100.

For example, the refractive index matching layer 105 may include an organic insulating material such as an acrylic resin, a siloxane resin, etc., or an inorganic insulating material such as silicon oxide, silicon nitride, etc. In an embodiment, the refractive index matching layer 105 may further include inorganic particles such as titanium oxide ($TiO_2$), zirconium oxide ($ZrO_2$), tin oxide ($SnO_2$), alumina ($Al_2O_3$), tantalum oxide ($Ta_2O_5$), or the like. For example, the inorganic particles may be included in the refractive index matching layer 105 to relatively increase the refractive index.

Figure 4:
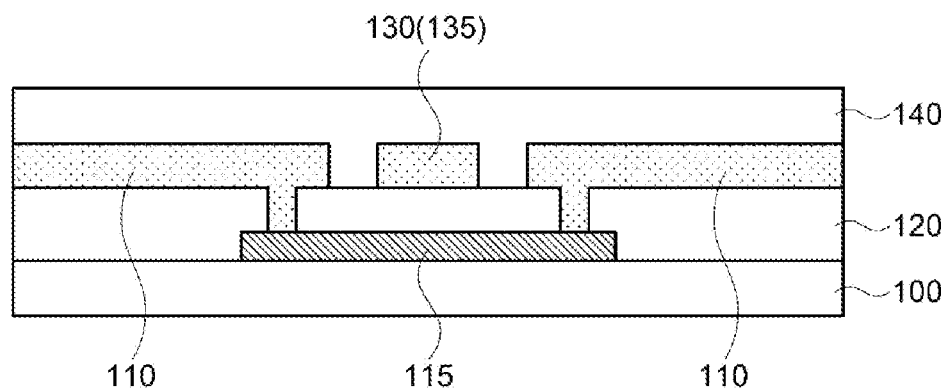
FIG. 4 is a schematic cross-sectional view, respectively, illustrating a touch sensor in accordance with some exemplary embodiments.

FIG. 4 is a schematic cross-sectional view, respectively, illustrating a touch sensor in accordance with some exemplary embodiments.

Referring to FIG. 4, the bridge electrode 115 may be formed on the substrate layer 100, and the insulating layer 120 may partially cover the bridge electrode 115.

The first sensing electrode 110 may be formed on the insulating layer 120 to fill a contact hole formed in the insulating layer 120. The neighboring first sensing electrodes 110 may be electrically connected by the bridge electrode 115 through the contact holes.

The second sensing electrodes 130 may be formed on the insulating layer and may extend in a direction crossing the first sensing electrodes 110.

The first sensing electrode 110 and the second sensing electrode 130 may have a structure and a material substantially the same as or similar to those described with reference to FIG. 2.

In some embodiments, the insulating layer 120 and/or the passivation layer 140 illustrated in FIGS. 2 to 4 may have a barrier layer or a barrier structure including a barrier material having improved moisture blocking ability.

In exemplary embodiments, the barrier material may include an aluminum oxide (e.g., $Al_2O_3$)-zinc oxide (e.g., ZnO) composite material (AZO), silazane, siloxane and/or a silicon-containing inorganic material.

The term "silazane" in the present application is used as encompassing a compound or a polymer including "—Si—N—Si—" structure. The term "siloxane" is used as encompassing a compound or a polymer containing "—Si—O—Si—" structure.

Examples of the silicon-containing inorganic material may include silicon oxide, silicon nitride and/or silicon oxynitride. These may be used alone or in combination of two or more therefrom. Preferably, at least two of silicon oxide, silicon nitride or silicon oxynitride may be used together, and more preferably, silicon oxide, silicon nitride and silicon oxynitride may be used together.

FIGS. 5 to 10 are schematic cross-sectional views illustrating barrier structures in accordance with some exemplary embodiments.

As described above, the insulating layer 120 and/or the passivation layer 140 may include the barrier layer including the barrier material. In some embodiments, the insulating layer 120 and/or the passivation layer 140 may include a barrier structure than may include the barrier layer and may have a multi-layered structure.

Figure 5:
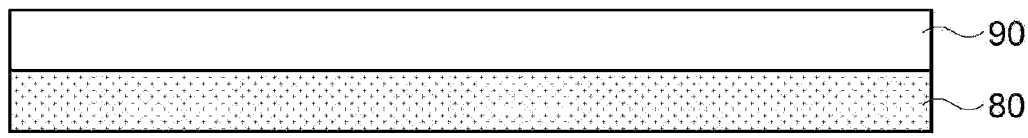
FIGS. 5 to 10 are schematic cross-sectional views illustrating barrier structures in accordance with some exemplary embodiments.

Referring to FIG. 5, the barrier structure may include a barrier layer 80 including the above-described barrier material and an organic layer 90 stacked on the barrier layer 80.

The organic layer 90 may include, e.g., an acrylic resin or a siloxane resin. The organic layer 90 may be formed on the barrier layer 80, so that etching damages of the barrier material may be prevented or reduced. In this case, the barrier layer 80 may include the AZO material or silazane.

For example, when the AZO material that may have a relatively poor etch resistance is included in the barrier layer 80, the etching damages (e.g., occurring when the passivation layer 140 is etched for a pad opening) may be effectively suppressed by the organic layer 90.

Figure 6:
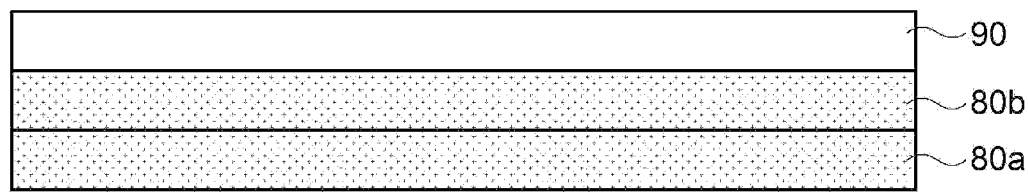

Referring to FIG. 6, the barrier structure may include a multi-layered barrier layer stack. For example, the organic layer 90 may be formed on the barrier layer stack including a lower barrier layer 80a and an upper barrier layer 80b.

In an embodiment, the lower barrier layer 80a and the upper barrier layer 80b may each independently include the AZO material or silazane.

Figure 7:
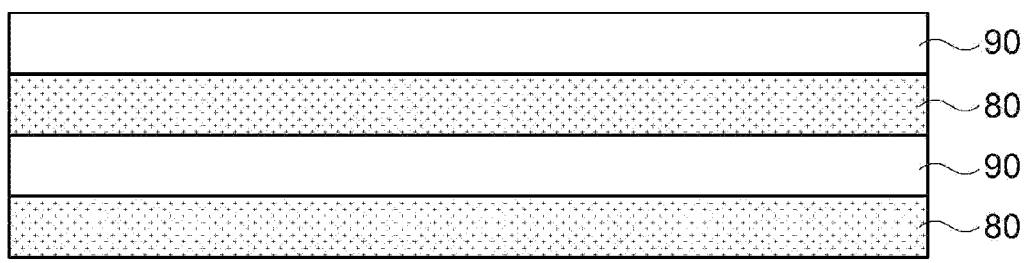

Referring to FIG. 7, the barrier layer 80 and the organic layer 90 may be alternately and repeatedly stacked. In this case, a plurality of the barrier layers 80 may be included while being separated from each other, the moisture blocking property may be further improved. As described above, each of the barrier layers 80 may include the AZO material or silazane.

Figure 8:
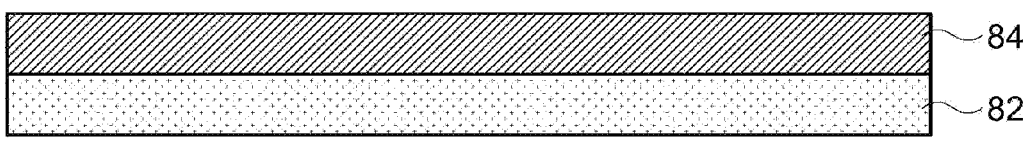

Referring to FIG. 8, the barrier structure may have a multi-layered structure (e.g., a double-layered structure) including a first barrier layer 82 and a second barrier layer 84.

In an embodiment, the first barrier layer 82 and the second barrier layer 84 may include the silicon-containing inorganic material.

In an embodiment, the first barrier layer 82 may include the silicon-containing inorganic material, and the second barrier layer 84 may include silazane.

Figure 9:
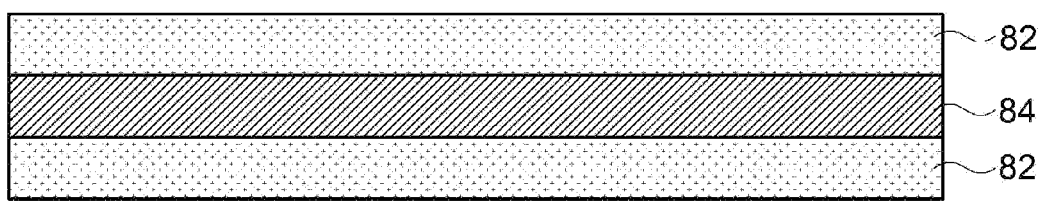

Referring to FIG. 9, the second barrier layer 84 may be sandwiched between the first barrier layers 82. For example, the first barrier layers 82 may be formed on upper and lower surfaces of the second barrier layer 84.

In an embodiment, the first barrier layers 82 including the silicon-containing inorganic material may cover the upper and lower surfaces of the silazane-containing second barrier layer 84, thereby preventing a moisture diffusion into an inside of the touch sensor more effectively.

Figure 10:
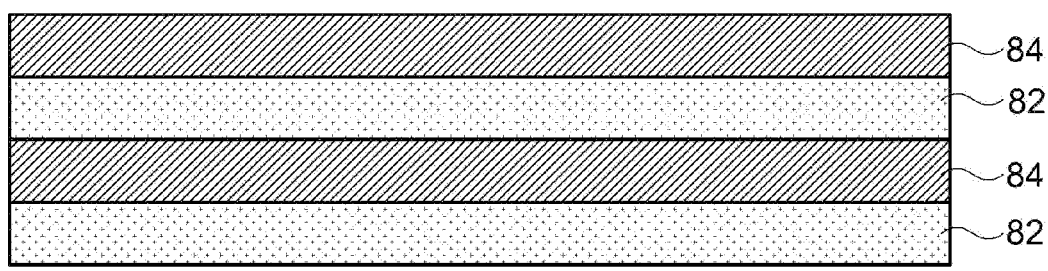

Referring to FIG. 10, the first barrier layer 82 and the second barrier layer 84 may be alternately and repeatedly stacked to form a structure having four or more layers.

In an embodiment, as illustrated in FIG. 10, the first barrier layers 82 including the silicon-containing inorganic material and the second barrier layers 84 including silazane may be alternately stacked to have a quadruple-layered structure serving as the barrier structure.

Each of the barrier layers illustrated in FIGS. 5 to 10 may have a thickness appropriately adjusted according to the material included therein. For example, if the barrier layer includes the AZO material, the thickness of the barrier layer may be from about 10 nm to about 1 µm. If the barrier layer includes silazane, the thickness of the barrier layer may be from about 100 nm to 2 µm. If the barrier layer includes the silicon-containing inorganic material, the thickness of the barrier layer may be from about 10 nm to about 1 µm.

A moisture permeability of the barrier layer or the barrier layer stack described above may be in a range from $10^{-6}$ to $10^{-1}$ g/m$^2$·24 hr at 40° C. and at a relative humidity of 90%.

Figure 11:
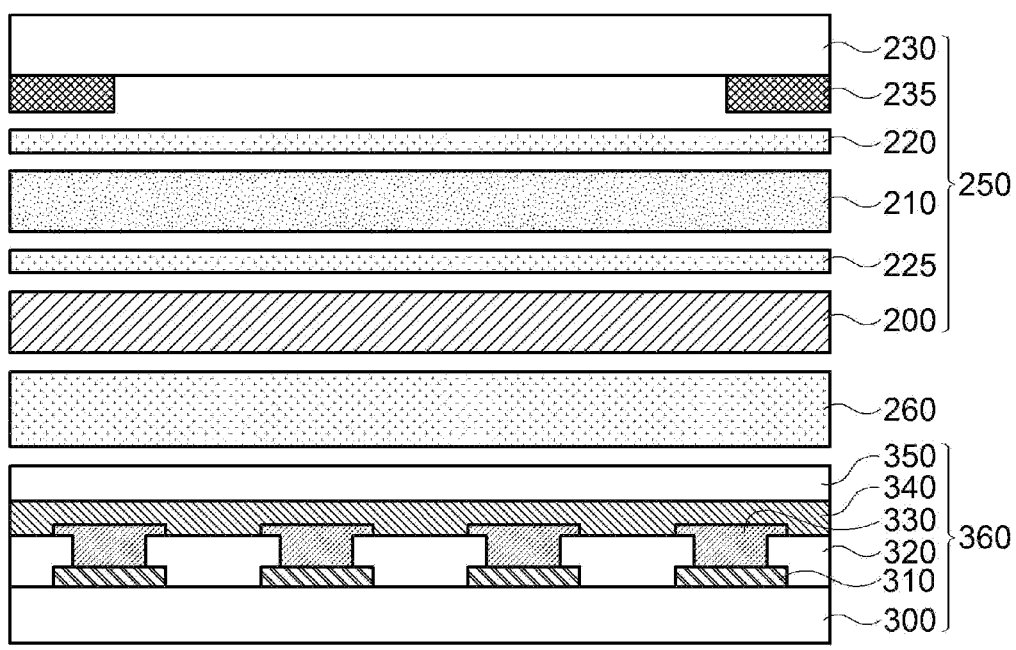
FIG. 11 is a schematic view illustrating a window stack structure and an image display device in accordance with exemplary embodiments.

FIG. 11 is a schematic view illustrating a window stack structure and an image display device in accordance with exemplary embodiments.

Referring to FIG. 11, a window stack structure 250 may include a window substrate 230, a polarizing layer 210 and a touch sensor 200 according to the above-described exemplary embodiments.

The window substrate 230 may include, e.g., a hard coating film. In an embodiment, a light-shielding pattern 235 may be formed on a peripheral portion of one surface of the window substrate 230. The light-shielding pattern 235 may include, e.g., a color-printed pattern, and may have a single-layered or multi-layered structure. A bezel portion or a non-display area of an image display device may be defined by the light-shielding pattern 235.

The polarizing layer 210 may include a coating-type polarizer or a polarizing plate. The coating-type polarizer may include a liquid crystal coating layer that may include a cross-linkable liquid crystal compound and a dichroic dye. In this case, the polarizing layer 210 may include an alignment layer for providing an orientation of the liquid crystal coating layer.

For example, the polarizing plate may include a polyvinyl alcohol-based polarizer and a protective film attached to at least one surface of the polyvinyl alcohol-based polarizer.

The polarizing layer 210 may be directly attached to the surface of the window substrate 330 or may be attached via a first adhesive layer 220.

The touch sensor 200 may be included in the window stack structure 250 as a form of a film or a panel. In an embodiment, the touch sensor 200 may be combined with the polarizing layer 210 via a second adhesive layer 225.

As illustrated in FIG. 11, the window substrate 230, the polarizing layer 210 and the touch sensor 200 may be sequentially positioned from a viewer's side. In this case, an electrode layer of the touch sensor 200 may be disposed under the polarizing layer 210 so that electrodes may be effectively prevented from being visually recognized. Further, a transmittance through the touch sensor may be improved using the sensing electrode stack structure that may have the optical ratio range as described above to prevent the electrode visual recognition more effectively.

In an embodiment, the touch sensor 200 may be directly transferred to the window substrate 230 or the polarizing layer 210. In an embodiment, the window substrate 230, the touch sensor 200 and the polarizing layer 210 may be sequentially positioned from the viewer's side.

The image display device may include a display panel 360 and the window stack structure 250 disposed on the display panel 360.

The display panel 360 may include a pixel electrode 310, a pixel defining layer 320, a display layer 330, an opposing electrode 340 and an encapsulation layer 350 disposed on a panel substrate 300.

A pixel circuit including a thin film transistor (TFT) may be formed on the panel substrate 300, and an insulation layer covering the pixel circuit may be formed. The pixel electrode 310 may be electrically connected to, e.g., a drain electrode of the TFT on the insulation layer.

The pixel defining layer 320 may be formed on the insulation layer, and the pixel electrode 310 may be exposed through the pixel defining layer 320 such that a pixel region may be defined. The display layer 330 may be formed on the pixel electrode 310, and the display layer 330 may include, e.g., a liquid crystal layer or an organic light emitting layer.

The opposing electrode 340 may be disposed on the pixel defining layer 320 and the display layer 330. The opposing electrode 340 may serve as, e.g., a common electrode or a cathode of the image display device. The encapsulation layer 350 may be disposed on the opposing electrode 340 to protect the display panel 360.

In some embodiments, the display panel 360 and the window stack structure 250 may be combined with each other through an adhesive layer 260. For example, a thickness of the adhesive layer 260 may be greater than each thickness of the first adhesive layer 220 and the second adhesive layer 225. A viscoelasticity of the adhesive layer 260 may be about 0.2 MPa or less at a temperature ranging from −20° C. to 80° C. In this case, a noise from the display panel 360 may be blocked, and an interface stress while being bent may be alleviated so that damages of the window stack structure 250 may be avoided. In an embodiment, the viscoelasticity of the adhesive layer 260 may be in a range from about 0.01 MPa to about 0.15 MPa.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Experimental Example 1: Evaluation of Optical Property According to Values of Equation 1

Sensing electrode layers of Examples and Comparative Examples each having a laminated structure of an IZO layer (refractive index: 1.96, thickness: 350 Å)—metal layer (thickness: 100 Å)—IZO layer (refractive index: 1.96, thickness: 350 Å) on a COP film (intrinsic transmittance of 90%) were formed. Material, refractive indexes and extinction coefficients of the metal layer are shown in Table 1 below.

Optical properties of the sensing electrode layers of Examples and Comparative Examples were evaluated. Specifically, reflectance and transmittance of the sensing electrode layers according to Examples and Comparative Examples relative to a wavelength light were measured in a wavelength range of 360 to 740 nm, and an extinction coefficient of the metal layer at a wavelength of 550 nm was calculated to evaluate the optical property as follows.

<Evaluation Criteria of Optical Property>

○: reflectance<10%, transmittance>80%

Δ: 10-15% reflectance, 70-80% transmittance x: reflectance>15%, transmittance<70%

The evaluation results are shown together in Table 1 below.

TABLE 1

|  | Material of Metal Layer | Refractive Index of Metal Layer | Extinction Coefficient of Metal Layer | Value of Equation 1 * Extinction Coefficient/ (Refractive Index of IZO layer-Refractive Index of metal layer) | Evaluation of Optical Property |
|---|---|---|---|---|---|
| Example 1 | Gold (Au) | 0.42 | 2.47 | 1.60 | Δ |
| Example 2 | Silver (Ag) | 0.06 | 3.6 | 1.89 | Δ |
| Example 3 | Silver Alloy (APC) | 0.15 | 3.74 | 2.07 | ○ |
| Example 4 | Copper (Cu) | 1.01 | 2.58 | 2.72 | Δ |
| Comparative Example 1 | Aluminum (Al) | 1.02 | 6.63 | 7.05 | X |
| Comparative Example 2 | Molybdenum (Mo) | 0.96 | 9.34 | 9.34 | X |

Experimental Example 2: Evaluation of Optical Properties According to Thickness Change Transmittance, reflectance and color coordinate values (a*, b*) were measured using CM-3600A (manufactured by Minolta) for samples from which the thickness of each layer in the sensing electrode having the stack structure of Example 3 was changed.

The results are shown in Table 2 below.

TABLE 2

|  | Thickness | Transmitted Light | | | Reflected Light | | |
|---|---|---|---|---|---|---|---|
| Sample | (IZO layer/metal layer/IZO layer) | Transmittance (D65) | a* (D65) | b* (D65) | Reflectance (D65) | a* (D65) | b* (D65) |
| 1 | 330 Å/90 Å/330 Å | 84.93 | −0.91 | 5.13 | 7.74 | −4.15 | −7.88 |
| 2 | 330 Å/100 Å/330 Å | 85.34 | −1.22 | 5.02 | 7.11 | −3.01 | −7.83 |
| 3 | 330 Å/110 Å/330 Å | 85.78 | −1.54 | 4.76 | 6.45 | −1.49 | −7.57 |
| 4 | 410 Å/90 Å/410 Å | 86.50 | −0.88 | 3.71 | 6.84 | −6.09 | −1.58 |
| 5 | 410 Å/100 Å/410 Å | 87.18 | −1.30 | 3.79 | 5.93 | −4.65 | −1.93 |
| 6 | 410 Å/110 Å/410 Å | 87.71 | −1.88 | 3.62 | 5.18 | −1.86 | −0.79 |
| 7 | 370 Å/100 Å/370 Å | 86.46 | −1.26 | 3.82 | 6.30 | −3.53 | −2.12 |
| 8 | 250 Å/60 Å/250 Å | 81.52 | −1.69 | 0.83 | 4.12 | 7.29 | −1.43 |
| 9 | 550 Å/160 Å/550 Å | 78.98 | −3.54 | −0.46 | 4.5 | 14.35 | 3.63 |

Referring to Table 2, samples satisfying the above-described optical ratio range and thickness range of each layer of the sensing electrode generally provided a transmittance of about 84% or more and a reflectance of less than about 7%, and a color coordinate value in the range of ±10.

Experimental Example 3: Evaluation of Folding Property

For the touch sensor samples of Examples 1 and 2, a linear resistance was measured after folding 100 times and folding 600,000 times under a curvature 2R (2 mm) condition. The results are shown in Table 3 below.

TABLE 3

|  | Linear Resistance after folding 100 times | Linear Resistance after folding 600,000 time |
|---|---|---|
| Example 1 | 387.9 Ω | 387.8 Ω |
| Example 2 | 186.6 Ω | 186.6 Ω |

Referring to Table 3, the linear resistance values after folding 100 times were substantially maintained even after folding 600,000 times.

Experimental Example 4: Evaluation of Moisture Permeability of Barrier Layer

A moisture permeability was evaluated at 40° C. and 90% relative humidity using a plurality of samples in which the material of the barrier layer applied to the passivation layer and/or the insulating layer of the touch sensor as described above was changed.

Specifically, a sample having a size of 50 cm$^2$ was prepared and the moisture permeability was measured using devices of Permatran W-3/33 and Aquatran 2 manufactured by MOCON.

The evaluation results are shown in Table 4 below.

TABLE 4

| | Barrier layer structure (thickness) | Moisture Permeability (g/m$^2$ · 24 hr) |
|---|---|---|
| Sample 1 | SiNx (300 nm) | 7.1 |
| Sample 2 | SiO$_2$ (300 nm) | $1.28 \times 10^{-2}$ |
| Sample 3 | SiON (300 nm) | $2.48 \times 10^{-2}$ |
| Sample 4 | AZO (20 nm) | $1.38 \times 10^{-2}$ |
| Sample 5 | AZO (40 nm) | $1.08 \times 10^{-2}$ |
| Sample 6 | AZO (60 nm) | $9.08 \times 10^{-3}$ |
| Sample 7 | AZO (80 nm) | $5.08 \times 10^{-3}$ |
| Sample 8 | AZO (100 nm) | $9.18 \times 10^{-4}$ |
| Sample 9 | Silazane (400 nm) | $2.98 \times 10^{-2}$ |
| Sample 10 | (Upper Layer) SiO$_2$ (300 nm) (Lower Layer) SiO$_2$ (300 nm) | $28 \times 10^{-3}$ |
| Sample 11 | (Upper Layer) SiON (300 nm) (Lower Layer) SiO$_2$ (300 nm) | $58 \times 10^{-5}$ |
| Sample 12 | (Upper Layer) SiO$_2$ (300 nm) (Lower Layer) SiON (300 nm) | $7.68 \times 10^{-4}$ |

Referring to Table 4, the moisture permeability was reduced to less than $10^{-1}$ g/m$^2$·24 hr when using AZO or silazane. When the silicon-containing inorganic material was used, the moisture permeability was more effectively reduced by employing a multi-layered structure of different materials.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A touch sensor, comprising:
a substrate layer; and
sensing electrodes arranged on the substrate layer, the sensing electrodes including a stacked structure of a transparent oxide electrode layer and a metal layer, and having an optical ratio of 5 or less as defined by Equation 1:

optical ratio=extinction coefficient of the metal layer/
(|a refractive index of the transparent oxide
electrode layer–a refractive index of the metal
layer|)     [Equation 1].

2. The touch sensor according to claim 1, wherein the optical ratio of the sensing electrode is 3 or less.

3. The touch sensor according to claim 1, wherein the sensing electrode comprises a first transparent oxide electrode layer, the metal layer and a second transparent oxide electrode layer sequentially stacked on the substrate layer.

4. The touch sensor according to claim 3, wherein an optical ratio between the metal layer and the first transparent oxide electrode layer is 5 or less, and an optical ratio between the metal layer and the second transparent oxide electrode layer is 5 or less.

5. The touch sensor according to claim 3, wherein each thickness of the first transparent oxide electrode layer and the second transparent oxide electrode layer is from 100 to 700 Å, and a thickness of the metal layer is from 50 to 300 Å.

6. The touch sensor according to claim 3, wherein each thickness of the first transparent oxide electrode layer and the second transparent oxide electrode layer is from 300 to 500 Å, and a thickness of the metal layer is from 70 to 150 Å.

7. The touch sensor according to claim 3, further comprising a refractive index matching layer formed between the first transparent oxide electrode layer and the substrate layer.

8. The touch sensor according to claim 7, wherein the refractive index matching layer has a refractive index between a refractive index of the substrate layer and a refractive index of the first transparent oxide electrode layer.

9. The touch sensor according to claim 1, wherein the refractive index of the transparent oxide electrode layer is from 1.7 to 2.2.

10. The touch sensor according to claim 1, wherein the metal layer includes a silver (Ag) alloy.

11. The touch sensor according to claim 1, wherein the sensing electrodes include first sensing electrodes arranged in a row direction and second sensing electrodes arranged in a column direction.

12. The touch sensor according to claim 11, further comprising a connection portion integrally connected with the second sensing electrodes in the column direction.

13. The touch sensor according to claim 12, wherein the first sensing electrodes are spaced apart from each other in the row direction with the connection portion interposed therebetween, wherein the touch sensor further comprises a bridge electrode electrically connecting the first sensing electrodes adjacent to each other with the connection portion interposed therebetween.

14. The touch sensor according to claim 11, further comprising:
   an insulating layer insulating the first sensing electrodes and the second sensing electrodes from each other; and
   a passivation layer formed on the insulating layer,
   wherein at least one of the insulating layer or the passivation layer includes a barrier layer or a barrier structure including an aluminum oxide-zinc oxide (AZO) composite material, silazane, siloxane or a silicon-containing inorganic material.

15. The touch sensor according to claim 14, wherein the barrier structure further comprises an organic layer stacked on the barrier layer.

16. The touch sensor according to claim 15, wherein the barrier structure includes a plurality of the barrier layer and a plurality of the organic layer alternately stacked.

17. The touch sensor according to claim 14, wherein the barrier layer has a multi-layered structure including a first barrier layer and a second barrier layer.

18. The touch sensor according to claim 17, wherein the first barrier layer includes the silicon-containing inorganic material and the second barrier layer includes silazane.

19. A window stack structure, comprising:
   a window substrate; and
   the touch sensor according to claim 1 stacked on the window substrate.

20. An image display device, comprising:
   a display panel; and
   the touch sensor according to claim 1 stacked on the display panel.

* * * * *